US012632536B2

(12) United States Patent
Cao

(10) Patent No.: US 12,632,536 B2
(45) Date of Patent: May 19, 2026

(54) TRUSTED EXECUTION ENVIRONMENT CONSTRUCTION METHODS, APPARATUSES, AND DEVICES

(71) Applicant: Alipay (Hangzhou) Information Technology Co., Ltd., Hangzhou (CN)

(72) Inventor: Shuang Cao, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 217 days.

(21) Appl. No.: 18/482,679

(22) Filed: Oct. 6, 2023

(65) Prior Publication Data

US 2024/0037219 A1      Feb. 1, 2024

Related U.S. Application Data

(63) Continuation of application No. PCT/CN2022/085266, filed on Apr. 6, 2022.

(30) Foreign Application Priority Data

Apr. 6, 2021    (CN) .......................... 202110369397.1

(51) Int. Cl.
G06F 21/00          (2013.01)
G06F 21/53          (2013.01)
(52) U.S. Cl.
CPC ........ G06F 21/53 (2013.01); G06F 2221/033 (2013.01)
(58) Field of Classification Search
CPC .... G06F 21/53; G06F 2221/033; G06F 21/57; G06F 21/577; G06F 2221/2105
See application file for complete search history.

(56) References Cited

U.S. PATENT DOCUMENTS

| | | | | |
|---|---|---|---|---|
| 2014/0143843 A1* | 5/2014 | Scaife | ................... | H04L 63/101 |
| | | | | 726/5 |
| 2016/0078539 A1 | 3/2016 | Ignatovich et al. | | |
| 2016/0350534 A1 | 12/2016 | Poornachandran et al. | | |
| 2019/0140836 A1* | 5/2019 | Novak | .................... | G06F 21/74 |

(Continued)

FOREIGN PATENT DOCUMENTS

| | | |
|---|---|---|
| CN | 101266571 | 9/2008 |
| CN | 101493870 | 7/2009 |

(Continued)

OTHER PUBLICATIONS

Fan et al., "Research on Trusted Execution Environment Building Technology Based on TrustZone," Netinfo Security, 2016, 16(3): 21-27 (with English Abstract).

(Continued)

*Primary Examiner* — Ghazal B Shehni
(74) *Attorney, Agent, or Firm* — Fish & Richardson P.C.

(57) ABSTRACT

Trusted execution environment construction is described and includes obtaining regulatory requirement information of a trusted execution environment. The regulatory requirement information is parsed to obtain atomized security function information applied to the trusted execution environment. Formal parsing processing is performed on the security function information to obtain a security solution of the trusted execution environment to prove that it satisfies the regulatory requirement information and generating a test case corresponding to the security solution based on an axiom of the security solution. Using a predetermined property migration mechanism based on the security solution and the test case corresponding to the security solution, a trusted execution environment is constructed that has same property information as the security solution and the test case with respect to a predetermined property item in a target scenario.

20 Claims, 5 Drawing Sheets

(56) References Cited

U.S. PATENT DOCUMENTS

| | | | |
|---|---|---|---|
| 2019/0243963 A1 | 8/2019 | Soriente et al. | |
| 2021/0011741 A1 | 1/2021 | Bartfai-Walcott et al. | |
| 2021/0344514 A1* | 11/2021 | Barrett | H04L 63/126 |
| 2022/0180009 A1* | 6/2022 | Remezov | G06F 21/85 |
| 2022/0303123 A1* | 9/2022 | Cabre | H04L 9/0825 |

FOREIGN PATENT DOCUMENTS

| | | |
|---|---|---|
| CN | 102136047 | 7/2011 |
| CN | 103701607 | 4/2014 |
| CN | 110008125 | 7/2019 |
| CN | 111082934 | 4/2020 |
| CN | 111400716 | 7/2020 |
| CN | 113158178 | 7/2021 |

OTHER PUBLICATIONS

Gerking et al., "Model-driven test case design for model-to-model semantics preservation," Proceedings of the 6th International Workshop on Automating Test Case Design, Selection and Evaluation, Aug. 30, 2015, p. 1-7.

International Preliminary Report on Patentability in in Appln. No. PCT/CN2022/085266, mailed on Oct. 19, 2023, 12 pages.

International Search Report and Written Opinion in Appln. No. PCT/CN2022/085266, mailed on Jun. 28, 2022 , 17 pages (with English translaiton).

Satpathy et al., "Test case generation from formal models through abstraction refinement and model checking," Proceedings of the 3rd international workshop on Advances in model-based testing, Jul. 9, 2007, pp. 85-94 (abstract only).

Zhang et al., "A security Function Test Suite Generation Method Based on Security Policy Model," Journal of Computer Research and Development, 2009, 46(10):1686-1692 (with English Abstract).

Zhang et al., "A TrustZone Based Application Protection Scheme in Highly Open Scenarios," Journal of Computer Research and Development, 2017, 54(10):2268-2283 (with English Abstract).

Extended European Search Report in European Appln. No. 22784034. 5, mailed on Jul. 18, 2024, 10 pages.

* cited by examiner

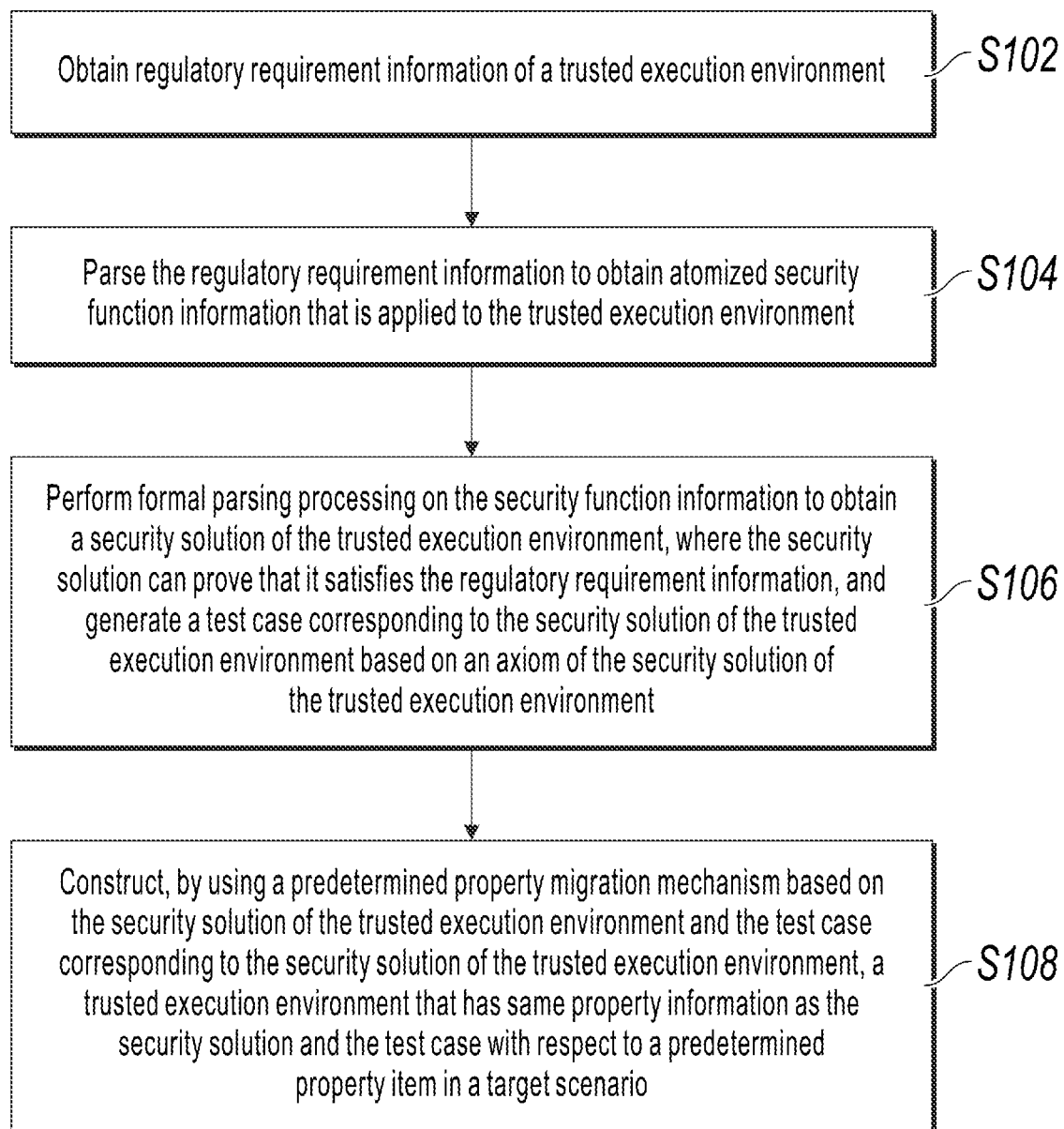

Obtain regulatory requirement information of a trusted execution environment — S102

Parse the regulatory requirement information to obtain atomized security function information that is applied to the trusted execution environment — S104

Perform formal parsing processing on the security function information to obtain a security solution of the trusted execution environment, where the security solution can prove that it satisfies the regulatory requirement information, and generate a test case corresponding to the security solution of the trusted execution environment based on an axiom of the security solution of the trusted execution environment — S106

Construct, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario — S108

FIG. 1

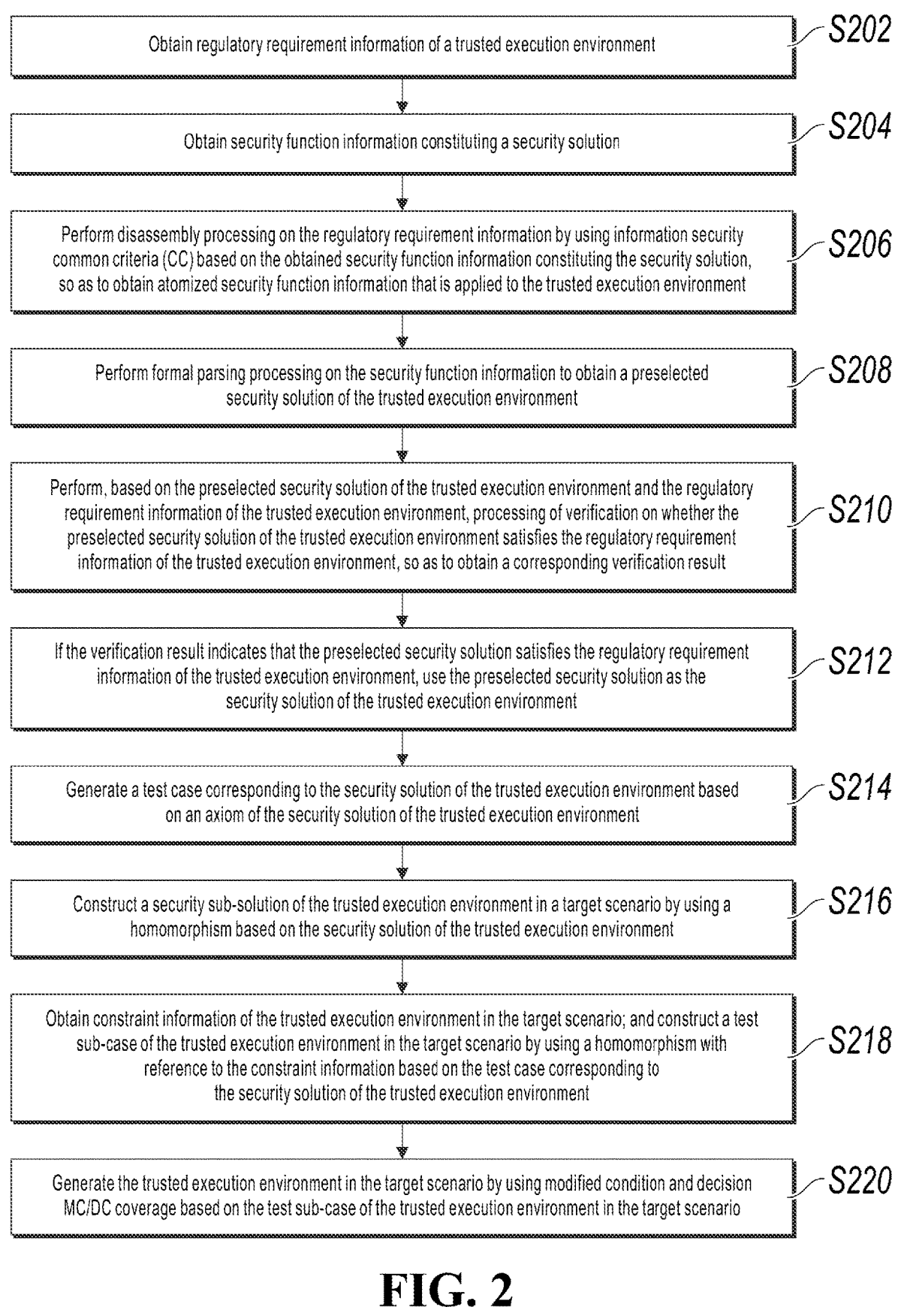

Obtain regulatory requirement information of a trusted execution environment — S202

Obtain security function information constituting a security solution — S204

Perform disassembly processing on the regulatory requirement information by using information security common criteria (CC) based on the obtained security function information constituting the security solution, so as to obtain atomized security function information that is applied to the trusted execution environment — S206

Perform formal parsing processing on the security function information to obtain a preselected security solution of the trusted execution environment — S208

Perform, based on the preselected security solution of the trusted execution environment and the regulatory requirement information of the trusted execution environment, processing of verification on whether the preselected security solution of the trusted execution environment satisfies the regulatory requirement information of the trusted execution environment, so as to obtain a corresponding verification result — S210

If the verification result indicates that the preselected security solution satisfies the regulatory requirement information of the trusted execution environment, use the preselected security solution as the security solution of the trusted execution environment — S212

Generate a test case corresponding to the security solution of the trusted execution environment based on an axiom of the security solution of the trusted execution environment — S214

Construct a security sub-solution of the trusted execution environment in a target scenario by using a homomorphism based on the security solution of the trusted execution environment — S216

Obtain constraint information of the trusted execution environment in the target scenario; and construct a test sub-case of the trusted execution environment in the target scenario by using a homomorphism with reference to the constraint information based on the test case corresponding to the security solution of the trusted execution environment — S218

Generate the trusted execution environment in the target scenario by using modified condition and decision MC/DC coverage based on the test sub-case of the trusted execution environment in the target scenario — S220

FIG. 2

TRUSTED EXECUTION ENVIRONMENT CONSTRUCTION METHODS, APPARATUSES, AND DEVICES

CROSS-REFERENCE TO RELATED APPLICATIONS

This application is a continuation of PCT Application No. PCT/CN2022/085266, filed on Apr. 6, 2022, which claims priority to Chinese Patent Application No. 202110369397.1, filed on Apr. 6, 2021, and each application is hereby incorporated by reference in its entirety.

TECHNICAL FIELD

This specification relates to the field of computer technologies, and in particular, to trusted execution environment construction methods, apparatuses, and devices.

BACKGROUND

Trusted execution environments as security technologies have been widely applied to various financial scenarios. At present, many regulatory authorities raise multiple criteria for the trusted execution environments. However, how to make specific products comprehensive and consistently satisfy regulatory requirements has always been a technical problem. Especially in a current trend of localization process, how to migrate an existing trusted execution environment instance (such as SGX or TrustZone) to an instruction set such as RISC-V while satisfying the regulatory requirements is also a challenge. To this end, it is necessary to provide feasible execution environment construction solutions that can implement property transfer and function migration of trusted execution environments.

SUMMARY

An objective of the embodiments of this specification is to provide feasible execution environment construction solutions that can implement property transfer and function migration of a trusted execution environment.

To implement the above-mentioned technical solutions, the embodiments of this specification are implemented as follows: According to a trusted execution environment construction method provided in some embodiments of this specification, the method includes the following: Regulatory requirement information of a trusted execution environment is obtained. The regulatory requirement information is parsed to obtain atomized security function information that is applied to the trusted execution environment. Formal parsing processing is performed on the security function information to obtain a security solution of the trusted execution environment, where the security solution can prove that it satisfies the regulatory requirement information, and a test case corresponding to the security solution of the trusted execution environment is generated based on an axiom of the security solution of the trusted execution environment. A trusted execution environment that has same property information as the security solution and the test case with respect to a predetermined property item in a target scenario is constructed by using a predetermined property migration mechanism based on the security solution of the trusted execution environment and the test case corresponding to the security solution of the trusted execution environment.

According to a trusted execution environment construction apparatus provided in some embodiments of this specification, the apparatus includes a regulatory requirement acquisition module, a regulatory requirement parsing module, a processing module, and a trusted-environment construction module. The regulatory requirement acquisition module is configured to obtain regulatory requirement information of a trusted execution environment. The regulatory requirement parsing module is configured to parse the regulatory requirement information to obtain atomized security function information that is applied to the trusted execution environment. The processing module is configured to perform formal parsing processing on the security function information to obtain a security solution of the trusted execution environment, where the security solution can prove that it satisfies the regulatory requirement information, and generate a test case corresponding to the security solution of the trusted execution environment based on an axiom of the security solution of the trusted execution environment. The trusted-environment construction module is configured to construct, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario.

According to a trusted execution environment construction device provided in some embodiments of this specification, the trusted execution environment construction device includes a processor; and a storage configured to store a computer-executable instruction, where when the executable instruction is executed, the processor is enabled to obtain regulatory requirement information of a trusted execution environment; parse the regulatory requirement information to obtain atomized security function information that is applied to the trusted execution environment; perform formal parsing processing on the security function information to obtain a security solution of the trusted execution environment, where the security solution can prove that it satisfies the regulatory requirement information, and generate a test case corresponding to the security solution of the trusted execution environment based on an axiom of the security solution of the trusted execution environment; and construct, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario.

Some embodiments of this specification further provide a storage medium, where the storage medium is configured to store a computer-executable instruction, and when executed, the executable instruction implements the following procedure: Regulatory requirement information of a trusted execution environment is obtained. The regulatory requirement information is parsed to obtain atomized security function information that is applied to the trusted execution environment. Formal parsing processing is performed on the security function information to obtain a security solution of the trusted execution environment, where the security solution can prove that it satisfies the regulatory requirement information, and a test case corresponding to the security solution of the trusted execution environment is generated based on an axiom of the security solution of the trusted execution environment. A trusted execution environment that has same property information as the security solution and the test case with respect to a predetermined property item in a target scenario is constructed by using a predetermined property migration mechanism based on the security solution of the trusted execution environment and the test case corresponding to the security solution of the trusted execution environment.

BRIEF DESCRIPTION OF DRAWINGS

To describe the technical solutions in some embodiments of this specification or in an existing technology more clearly, the following briefly describes the accompanying drawings needed for describing the embodiments or the existing technology. Clearly, the accompanying drawings in the following descriptions merely show some embodiments of this specification, and a person of ordinary skill in the art can still derive other drawings from these accompanying drawings without creative efforts.

FIG. 1 illustrates some embodiments of a trusted execution environment construction method, according to this specification;

FIG. 2 illustrates some embodiments of another trusted execution environment construction method, according to this specification;

DESCRIPTION OF EMBODIMENTS

Figure 3:
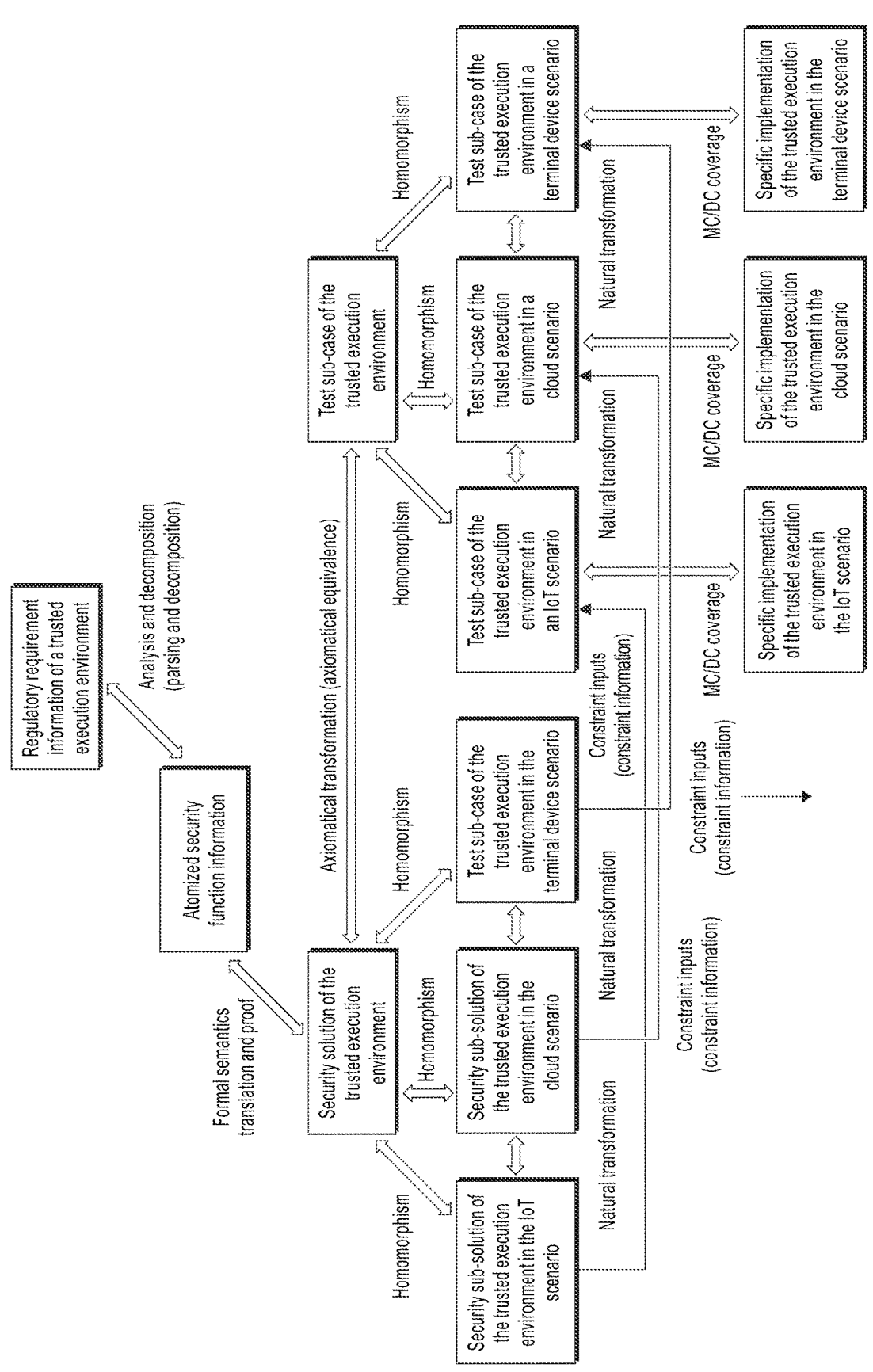
FIG. 3 is a schematic diagram illustrating a trusted execution environment construction process, according to this specification.

Some embodiments of this specification provide trusted execution environment construction methods, apparatuses, and devices.

To make a person skilled in the art better understand the technical solutions in this specification, the following clearly and comprehensively describes the technical solutions in some embodiments of this specification with reference to the accompanying drawings in some embodiments of this specification. Clearly, the described embodiments are merely some but not all of the embodiments of this specification. All other embodiments obtained by a person of ordinary skill in the art based on the embodiments of this specification without creative efforts shall fall within the protection scope of this specification.

Embodiment 1

As shown in FIG. 1, some embodiments of this specification provide a trusted execution environment construction method. An execution body of the method can be a server or a terminal device. The terminal device can be a computer device such as a notebook computer or a desktop computer, or can be a mobile terminal device such as a mobile phone or a tablet computer. The server can be a server that constructs an executable environment for a certain service (e.g., a service that performs a transaction or a financial service, etc.) or can be a server that needs to construct an executable environment for a certain device (e.g., an Internet of Things device, a cloud device, or a mobile terminal device, etc.). Specifically, for example, the server can be a server of a payment service, or can be a server, etc. related to a service such as finance or instant messaging. The execution body in the embodiments is described by using a server as an example. For a case in which the execution body is a terminal device, reference can be made to the following related content. Details are omitted here for simplicity. The method can specifically include the following steps:

In step S102, regulatory requirement information of a trusted execution environment is obtained.

The trusted execution environment can be a trusted execution environment (TEE), and the trusted execution environment can be a secure running environment for performing data processing. The trusted execution environment can be implemented by a program compiled using a predetermined programming language (i.e., can be implemented in a form of software), or can be implemented by a specified entity component and a compiled program (i.e., can be implemented in a form of hardware and software). The embodiments of this specification set no limitation on which of the above-mentioned forms is used to implement the trusted execution environment, and a specific implementation form can be specified based on an actual situation. The trusted execution environment can be a data processing environment that is safe and isolated from another environment. To be specific, processing performed in the trusted execution environment and data, etc. generated in a data processing process cannot be accessed by another execution environment or an application program outside the executable environment. The trusted execution environment can be implemented by creating a small operating system that can run independently in a trusted zone (e.g., TrustZone), and the trusted execution environment can directly provide a service by way of system invoking (e.g., direct processing by a TrustZone kernel). A terminal device can include a rich execution environment (REE) and a trusted execution environment (TEE). An operating system, such as an Android operating system, an iOS operating system, a Windows operating system, or a Linux operating system, installed on the terminal device can be run in the REE. The REE can provide an upper-layer application program with all functions of the terminal device, such as a camera function and a touch function. However, many security risks exist in the REE. For example, the operating system can obtain all data of a certain application program, but it is difficult to verify whether the operating system or the application program is tampered with. If the operating system or the application program is tampered with, information about a user is confronted with a large security hazard. For this, the trusted execution environment in the terminal device is needed to perform processing. The trusted execution environment has its own execution space, in other words, one operating system also exists in the trusted execution environment. The trusted execution environment has a higher security level than the REE. Software and hardware resources in the terminal device that are accessible by the trusted execution environment are separated from the REE, but the trusted execution environment can directly obtain information in the REE, and the REE cannot obtain information in the trusted execution environment. The trusted execution environment can perform processing such as verification by using a provided interface, so as to ensure that user information (such as payment information and user privacy information) is not tampered with, no password is hijacked, and information such as a fingerprint or a face is not stolen. The regulatory requirement information can be related information that defines and regulates a trusted execution environment construction way, a security processing mechanism needed, an architecture of the trusted execution environment, a life cycle, a password input and modification method, a message output mechanism, an identity authentication function, and a clock function. Specifically, for example, the regulatory requirement information can include a related transaction in a trusted service, needs to ensure atomicity, consistency, isolation, and persistence, and restricts an unauthorized TA from accessing a trusted service, etc. in the trusted execution environment. In addition to the above-mentioned way, multiple types of regulatory requirement information can be further included, which can be specifically specified based on an actual situation. The embodiments of this specification sets no limitation thereto.

During implementation, trusted execution environments as security technologies have been widely applied to various financial scenarios. At present, many regulatory authorities raise multiple criteria for the trusted execution environments. However, how to make specific products comprehensive and consistently satisfy regulatory requirements has always been a technical problem. Especially in a current trend of localization process, how to migrate an existing trusted execution environment instance (such as SGX or TrustZone) to an instruction set such as RISC-V while satisfying the regulatory requirements is also a challenge. To this end, it is necessary to provide feasible execution environment construction solutions that can implement property transfer and function migration of trusted execution environments.

In actual applications, information security common criteria (Common Criteria, CC) propose an executable-environment construction solution. To be specific, from a protection profile (PP), a specific constructed executable environment is split into different security function requirements (SFRs), and a detailed design for binding specific scenarios with the security function requirements is carried out to finally obtain executable environments in the scenarios. However, in the above-mentioned executable-environment construction solution, neither security requirement migration between different specific scenarios nor completeness detection and consistency detection on the migration are involved. Therefore, reusability of the above-mentioned executable-environment construction solution is poor. In other words, each time a corresponding trusted execution environment needs to be constructed for a certain scenario, the above-mentioned comprehensive process needs to be re-performed, and trusted execution environment construction efficiency is low. Some embodiments of this specification provide an implementable trusted execution environment construction solution, which can specifically include the following content: In actual applications, a finally constructed trusted execution environment in any scenario needs to satisfy a trusted execution environment regulatory requirement. The regulatory requirement can be basic conditions and related information that are provided by a specified institution or authority and that need to be satisfied for constructing the feasible execution environment. The regulatory requirement can be a regulatory requirement released by a third-party authority (for example, a regulatory authority of a certain country), or can be a regulatory requirement specified by a service provider based on a regulatory requirement released by a third-party authority in combination with a need of the service provider, and the specified regulatory requirement can satisfy the regulatory requirement released by the third-party authority. In addition, in actual applications, regulatory requirements corresponding to trusted execution environments in different scenarios can be different, and can be specifically specified based on an actual situation. The embodiments of this specification set no limitation thereto.

Based on the above-mentioned content, to construct a trusted execution environment that satisfies a regulatory requirement, corresponding regulatory requirement information can be obtained. The regulatory requirement corresponding to the regulatory requirement information can be a regulatory requirement for a certain scenario, or can be a general regulatory requirement (i.e., a regulatory requirement for any scenario), etc. Specifically, the corresponding regulatory requirement information can be obtained based on an actual situation. The embodiments of this specification set no limitation thereto.

In step S104, the regulatory requirement information is parsed to obtain atomized security function information that is applied to the trusted execution environment.

Atomization can be a processing approach that splits and decomposes, based on a usage or a function, etc. of certain information or data, the information or data in a fine-grained way to obtain relatively small units (which can alternatively be minimum units in a process of the usage or function of the information or data). For example, the regulatory requirement information is often text-type information. To be specific, the regulatory requirement information includes macroscopic information about a regulatory requirement for a trusted execution environment. To convert macroscopic content in the regulatory requirement information into relatively intuitive fine-grained information, atomization processing can be performed on the regulatory requirement information. The security function information can be determined by using a security function requirement (SFR) in information security common criteria, or can be determined by using another rule. A specific determining method can be specified based on an actual situation. The embodiments of this specification set no limitation thereto.

During implementation, after the regulatory requirement information of the trusted execution environment is obtained by processing in step S102, splitting processing can be performed, from a protection profile based on the information security common criteria, on security functions constituting a security solution of the trusted execution environment. Specifically, because the information security common criteria are a framework, a developer of a trusted execution environment of a computer or an object with a trusted execution environment can develop a corresponding trusted execution environment based on a security function requirement (SFR) in the protection profile, so as to satisfy a regulatory requirement of the trusted execution environment. On this basis, the above-mentioned regulatory requirement information can be parsed and decomposed with reference to the security functions constituting the security solution of the trusted execution environment to obtain the atomized security function information (or an atomized security function requirement (SFR)).

In step S106, formal parsing processing is performed on the security function information to obtain a security solution of the trusted execution environment, where the security solution can prove that it satisfies the regulatory requirement information, and a test case corresponding to the security solution of the trusted execution environment is generated based on an axiom of the security solution of the trusted execution environment.

The formal parsing processing can include multiple implementable approaches, for example, can be implemented by using a formal semantics translation mechanism.

The formal semantics translation can be formally describing a to-be-processed object by using an algebraic structure. In addition, the above-mentioned formal parsing processing can also be implemented in multiple other ways, which can be specifically specified based on an actual situation. The embodiments of this specification set no limitation thereto.

During implementation, after the atomized security function information is obtained in the above-mentioned way, formal interpretation can be performed on the split atomized regulatory requirement information based on the formal semantics translation mechanism to obtain a corresponding security solution of the trusted execution environment. The obtained security solution of the trusted execution environment can be a general security solution of the trusted execution environment, and the general security solution can be a basis for security solutions of the trusted execution environment in different scenarios. In addition, for the general security solution of the trusted execution environment obtained in the above-mentioned way, it can be determined by way of proof that the general security solution satisfies the above-mentioned regulatory requirement information.

In addition, a test case corresponding to the security solution of the trusted execution environment can be further generated by using the security solution of the trusted execution environment. Specifically, content included in the general security solution can be axiomatized by using an axiomatical transformation mechanism so as to form an axiom of the general security solution. Then, by using the axiom of the general security solution, a test case corresponding to the security solution of the trusted execution environment can be determined. The obtained test case can be a general test case, and the general test case can be a basis for test cases of the trusted execution environment in different scenarios. The axiomatical transformation mechanism can be determined based on a formal axiomatic rule, or can be determined based on a substantive axiomatic rule, and can be specifically specified based on an actual situation. The embodiments of this specification set no limitation thereto.

It should be noted that the security solution of the trusted execution environment can be the above-mentioned general security solution. In actual applications, the security solution of the trusted execution environment can include not only the general security solution but also security solutions (which can be referred to as security sub-solutions) of the trusted execution environment in different scenarios. Correspondingly, the test case corresponding to the security solution of the trusted execution environment can include not only the general test case but also test cases (which can be referred to as test sub-cases) of the trusted execution environment in different scenarios, etc.

In step S108, a trusted execution environment that has same property information as the security solution and the test case with respect to a predetermined property item in a target scenario is constructed by using a predetermined property migration mechanism based on the security solution of the trusted execution environment and the test case corresponding to the security solution of the trusted execution environment.

The property migration mechanism can be a processing mechanism for migrating a property or a property of an object that has been verified or authenticated to another object that has a specified association relationship with the object. For example, for the general security solution of the trusted execution environment, if the general security solution has been verified and the general security solution satisfies the above-mentioned regulatory requirement information, when a security sub-solution of the trusted execution environment in a certain scenario is generated by using the general security solution, a property, of the general security solution, that satisfies the above-mentioned regulatory requirement information, etc. can be migrated to a security sub-solution of the trusted execution environment in the scenario by using the property migration mechanism. In this case, the security sub-solution also satisfies the above-mentioned regulatory requirement information. The predetermined property item can include one property item, or can include multiple property items. The property item can be, for example, "whether the regulatory requirement information is satisfied", "whether a technical solution corresponding to the general security solution is consistent with a technical solution corresponding to the security sub-solution", and "whether the technical solution corresponding to the general security solution and the technical solution corresponding to the security sub-solution are comprehensive", which can be specifically specified based on an actual situation. The embodiments of this specification set no limitation thereto. Property information can be content information corresponding to a property item. For example, if the property item is "whether the regulatory requirement information is satisfied", corresponding property information can be "the regulatory requirement information is satisfied", etc. The target scenario can be any scenario, such as a terminal device scenario or an Internet of Things scenario. In addition, the target scenario can include one scenario, or can include multiple different scenarios. A specific quantity of included scenarios can be specified based on an actual situation. The embodiments of this specification set no limitation thereto.

During implementation, after the security solution (i.e., the general security solution) of the trusted execution environment and the test case (i.e., the general test case) corresponding to the security solution of the trusted execution environment are obtained in the above-mentioned way, a security sub-solution of the trusted execution environment in the target scenario can be constructed based on the general security solution by using the predetermined property migration mechanism. Similarly, a test sub-case of the trusted execution environment in the target scenario can be constructed based on the general test case by using the predetermined property migration mechanism. Then, limitation information or completeness information including a resource occupation limitation, etc. in the security sub-solution of the trusted execution environment in the target scenario can be obtained, and the trusted execution environment in the target scenario can be constructed based on the test sub-case of the trusted execution environment in the target scenario with reference to the obtained limitation information or completeness information. In addition, a related property of the test sub-case can be migrated to the trusted execution environment in the target scenario by using the property migration mechanism, so that the generated trusted execution environment in the target scenario can satisfy the above-mentioned regulatory requirement information.

According to the trusted execution environment construction method provided in the embodiments of this specification, the obtained regulatory requirement information of the trusted execution environment is parsed to obtain the atomized security function information that is applied to the trusted execution environment. Then, formal parsing processing is performed on the security function information to obtain the security solution of the trusted execution environment, where the security solution can prove that it satisfies the regulatory requirement information, and the test case corresponding to the security solution of the trusted execution environment is generated based on the axiom of the security solution of the trusted execution environment. Further, the trusted execution environment that has the same property information as the security solution and the test case with respect to the predetermined property item in the target scenario is constructed by using the predetermined property migration mechanism based on the security solution of the trusted execution environment and the test case corresponding to the security solution of the trusted execution environment. As such, the general security solution and the general test case, etc. of the trusted execution environment are constructed based on a formal and axiomatical form, and the regulatory requirement is described on this basis, so that the regulatory requirement is consistent with the technical solutions such as the general security solution and the general test case and is comprehensive. In addition, by using the technical solutions provided in the embodiments, the regulatory requirement can be comprehensively and consistently transferred or migrated to a specific implementation of the trusted execution environment in the specific target scenario, so as to avoid repeated authentication on the regulatory requirement in different scenarios and improve trusted execution environment construction efficiency.

Embodiment 2

As shown in FIG. 2, some embodiments of this specification provide a trusted execution environment construction method. An execution body of the method can be a server or a terminal device. The terminal device can be a computer device such as a notebook computer or a desktop computer, or can be a mobile terminal device such as a mobile phone or a tablet computer. The server can be a server that constructs an executable environment for a certain service (e.g., a service that performs a transaction or a financial service, etc.) or can be a server that needs to construct an executable environment for a certain device (e.g., an Internet of Things device, a cloud device, or a mobile terminal device, etc.). Specifically, for example, the server can be a server of a payment service, or can be a server, etc. related to a service such as finance or instant messaging. The execution body in the embodiments is described by using a server as an example. For a case in which the execution body is a terminal device, reference can be made to the following related content. Details are omitted here for simplicity. The method can specifically include the following steps. In step S202, regulatory requirement information of a trusted execution environment is obtained.

The trusted execution environment TEE can include multiple different implementations. For example, the trusted execution environment can include one or more of a trusted execution environment constructed by using SGX and a predetermined first application program, a trusted execution environment constructed by using TrustZone and a predetermined second application program, and a trusted execution environment constructed by using a predetermined third application program. In other words, the trusted execution environment in the embodiments is not limited to a trusted execution environment constructed by software, and is not limited to a trusted execution environment constructed by hardware and software. A trusted execution environment implemented in any way can be applied to the embodiments of this specification.

In step S204, security function information constituting a security solution is obtained.

During implementation, as shown in FIG. 3, for a security solution (i.e., a general security solution) of the trusted execution environment, content of the security solution of the trusted execution environment can be analyzed to determine security functions included in the security solution. Then, the security functions constituting the security solution can be obtained from the security solution, and information about the security functions constituting the security solution can be obtained so as to obtain the security function information constituting the security solution.

It should be noted that, a description of the security functions constituting the general security solution is independent of a specific application scenario and implementation of the trusted execution environment.

In step S206, disassembly processing is performed on the regulatory requirement information by using information security common criteria (CC) based on the obtained security function information constituting the security solution, so as to obtain atomized security function information that is applied to the trusted execution environment.

A mutually exclusive collectively exhaustive (MECE) rule is satisfied between different security functions in the security functions corresponding to the atomized security function information. In other words, the security functions constituting the security solution are mutually independent, and the currently obtained security functions are exhausted with respect to the security solution.

In step S208, formal parsing processing is performed on the security function information to obtain a preselected security solution of the trusted execution environment.

As shown in FIG. 3, for specific processing of step S208, reference can be made to related content in step S106 in Embodiment 1. Details are omitted here for simplicity.

After the preselected security solution of the trusted execution environment is obtained in the above-mentioned way, it can be proved that the preselected security solution of the trusted execution environment can satisfy the regulatory requirement information of the trusted execution environment. For details, reference can be made to processing in step S210 and step S212 below.

In step S210, processing of verification on whether the preselected security solution of the trusted execution environment satisfies the regulatory requirement information of the trusted execution environment is performed based on the preselected security solution of the trusted execution environment and the regulatory requirement information of the trusted execution environment, so as to obtain a corresponding verification result.

During implementation, because formal interpretation has been performed on the split atomized regulatory requirement information above, the regulatory requirement information that has experienced the formal interpretation also satisfies the regulatory requirement information, and the preselected security solution obtained by formal interpretation also satisfies the regulatory requirement information.

In step S212, if the verification result indicates that the preselected security solution satisfies the regulatory requirement information of the trusted execution environment, the preselected security solution is used as the security solution of the trusted execution environment.

In step S214, a test case corresponding to the security solution of the trusted execution environment is generated based on an axiom of the security solution of the trusted execution environment.

As shown in FIG. 3, for specific processing of step S214, reference can be made to related content in step S106 in Embodiment 1. Details are omitted here for simplicity.

In step S216, a security sub-solution of the trusted execution environment in the target scenario is constructed by using a homomorphism interpretation based on the security solution of the trusted execution environment.

The target scenario can include one or more of an Internet of Things scenario, a cloud scenario, and a terminal device scenario. In addition, the target scenario can further include any application scenario in which a trusted execution environment needs to be constructed, and can be specifically specified based on an actual situation. The embodiments of this specification set no limitation thereto. A homomorphism interpretation is as follows: Assume that V1=(G, #) and V2=(S, o) are two algebraic systems, # and o are respectively binary operations on G and S; and assume that f is a mapping from G to S and f(a#b)=f(a) o f(b) is established for $\forall$a, b$\in$G, f is referred to as a homomorphism interpretation from V1 to V2.

During implementation, as shown in FIG. 3, after the general security solution of the trusted execution environment is obtained in the above-mentioned way, a property of the general security solution of the trusted execution environment can be vertically migrated (or transferred) to a subsequently generated security solution (i.e., a security sub-solution of the trusted execution environment in the target scenario) in a specific scenario by way of a homomorphism interpretation, so that the property, of the general security solution, that satisfies the above-mentioned regulatory requirement information is migrated to a security sub-solution of the trusted execution environment in the target scenario, and the security sub-solution of the trusted execution environment in the target scenario also has the property that satisfies the above-mentioned regulatory requirement information.

In addition, if the target scenario includes multiple different scenarios, for example, the target scenario can include an Internet of Things scenario, a cloud scenario, and a terminal device scenario, etc., a property of the security sub-solution of the trusted execution environment is migrated between security sub-solutions of the trusted execution environment in different scenarios by a natural transformation.

In the theory of categories in mathematics, a natural transformation can be a transformation of one functor into another, so that an internal structure (that is, a composition of morphisms) of a related category can be maintained. Therefore, a natural transformation can be considered as "a morphism between functors". Correspondingly, a related property existing in a certain scenario can be migrated to another scenario by using a natural transformation, so that the property in the scenario is migrated to the another scenario and maintained.

During implementation, as shown in FIG. 3, after the security sub-solutions of the trusted execution environment in different scenarios are obtained in the above-mentioned way, a verified property of a security sub-solution of the trusted execution environment in a certain scenario can be horizontally migrated (or transferred) to a security sub-solution of the trusted execution environment in another scenario by a natural transformation. As such, in the same general security solution, a property, of a security sub-solution in a certain scenario, that satisfies the above-mentioned regulatory requirement information is migrated to a security sub-solution in another scenario, so that the security sub-solution in the another scenario also has the property that satisfies the above-mentioned regulatory requirement information. As such, a security capability that satisfies a compliance requirement can be migrated to a new scenario or a new platform to avoid repeated authentication.

In step S218, constraint information of the trusted execution environment in the target scenario is obtained; and a test sub-case of the trusted execution environment in the target scenario is constructed by using a homomorphism interpretation with reference to the constraint information based on the test case corresponding to the security solution of the trusted execution environment.

Multiple types of constraint (constraint inputs) information can be included, such as constraint information related to resource occupation, a device attribute requirement (e.g., an operating frequency requirement of a device CPU or a memory requirement of a device), etc., and can be specifically specified based on an actual situation. The embodiments of this specification set no limitation thereto.

As shown in FIG. 3, for specific processing of step S218, reference can be made to related content in step S216 for execution. Details are omitted here for simplicity. In the above-mentioned way, a property, of the general test case, that satisfies the regulatory requirement information can be migrated vertically to form comprehensive matched test sub-cases.

In actual applications, the target scenario can include multiple different scenarios, and a property of the test sub-case of the trusted execution environment is migrated between test sub-cases of the trusted execution environment in different scenarios by a natural transformation.

For the above-mentioned specific processing, reference can be made to related content of step S216. Details are omitted here for simplicity. In the above-mentioned way, a property, of a test sub-case, that satisfies the regulatory requirement information can be migrated to a new scenario or a new platform to avoid repeated authentication.

As shown in FIG. 3, based on the above-mentioned content, relationships between the general security solution and security solutions in different scenarios are homomorphism interpretations, and relationships between the general test case and test sub-cases in different scenarios are homomorphism interpretations. In addition, a relationship satisfied between security sub-solutions in different scenarios based on the same general security solution is a natural transformation, and a relationship satisfied between test sub-cases in different scenarios based on the same general test case is a natural transformation.

In step S220, the trusted execution environment in the target scenario is generated by using modified condition and decision coverage (MC/DC coverage) based on the test sub-case of the trusted execution environment in the target scenario.

The modified condition and decision coverage (MC/DC coverage) can have a coverage rate of 100%, and can be used for engineering verification on an isomorphism between a specific implementation and technical specifications. MC/DC coverage requires that each type of input/output needs to occur at least once in a program. Each condition in the program needs to generate all possible output results at least once, and each condition in each decision needs to independently affect an output of one decision. To be specific, changing a value of the condition while maintaining other conditions unchanged changes a decision result. That is, each condition needs to independently affect the decision result. The above-mentioned content is described by using an example as follows: MC/DC coverage first requires implementation of condition coverage and decision coverage. On this basis, for each condition C, two calculations that satisfy the following conditions need to exist: (1) All conditions in a decision corresponding to condition C remain exactly the same except condition C; (2) a value of condition C is opposite; and (3) a calculation result of the decision is opposite.

During implementation, as shown in FIG. 3, based on the above-mentioned definition and example of MC/DC coverage, a test sub-case of the trusted execution environment in the target scenario can be correspondingly calculated. MC/DC coverage achieves a corresponding output result. The output result is the trusted execution environment in the target scenario (that is, a specific implementation of the trusted execution environment in the target scenario).

According to the trusted execution environment construction methods provided in the embodiments of this specification, the obtained regulatory requirement information of the trusted execution environment is parsed to obtain the atomized security function information that is applied to the trusted execution environment. Then, formal parsing processing is performed on the security function information to obtain the security solution of the trusted execution environment, where the security solution can prove that it satisfies the regulatory requirement information, and the test case corresponding to the security solution of the trusted execution environment is generated based on the axiom of the security solution of the trusted execution environment. Further, the trusted execution environment that has the same property information as the security solution and the test case with respect to a predetermined property item in the target scenario is constructed by using a predetermined property migration mechanism based on the security solution of the trusted execution environment and the test case corresponding to the security solution of the trusted execution environment. As such, the general security solution and the general test case, etc. of the trusted execution environment are constructed based on a formal and axiomatical form, and a regulatory requirement is described on this basis, so that the regulatory requirement is consistent with the technical solutions such as the general security solution and the general test case and is comprehensive. In addition, by using the technical solutions provided in the embodiments, the regulatory requirement can be comprehensively and consistently transferred or migrated to a specific implementation of the trusted execution environment in the specific target scenario, so as to avoid repeated authentication on the regulatory requirement in different scenarios and improve trusted execution environment construction efficiency.

In addition, a general technical solution of the trusted execution environment is constructed based on formalization in a form of a axiomatical constraint, and a regulatory requirement is described on this basis, so that the regulatory requirement is consistent with the general technical solution and is comprehensive. In addition, a homomorphic relationship between the general technical solution and a technical solution in a specific scenario is constructed, so that the regulatory requirement is consistent with the technical solution in the specific scenario and is comprehensive. Moreover, a natural transformation relationship between technical solutions in different scenarios is constructed, so that the regulatory requirement can be transferred between different scenarios. In addition, based on the axiomatical constraint, a general test case that is consistent with a regulatory requirement and that is comprehensive is formed, and a homomorphic relationship between the general test case and a test sub-case in a specific scenario is established, so that the test sub-case in the specific scenario is consistent with the regulatory requirement and is comprehensive. Moreover, a natural transformation relationship between test sub-cases in different specific scenarios is established, so that the test sub-cases in different scenarios are consistent with the regulatory requirement and are comprehensive.

Embodiment 3

Figure 4:
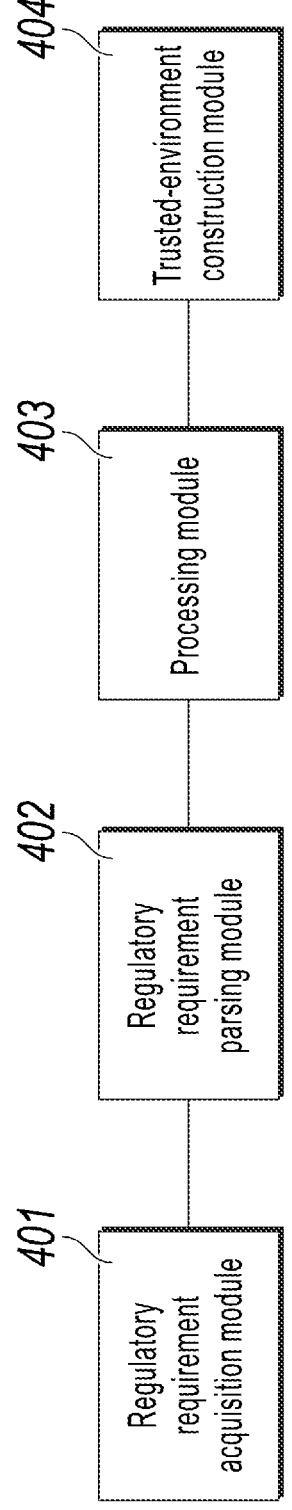
FIG. 4 illustrates some embodiments of a trusted execution environment construction apparatus, according to this specification.

The description above is the trusted execution environment construction method provided in some embodiments of this specification. Based on the same idea, some embodiments of this specification further provide a trusted execution environment construction apparatus, as shown in FIG. 4.

The trusted execution environment construction apparatus includes a regulatory requirement acquisition module 401, a regulatory requirement parsing module 402, a processing module 403, and a trusted-environment construction module 404. The regulatory requirement acquisition module 401 obtains regulatory requirement information of a trusted execution environment. The regulatory requirement parsing module 402 parses the regulatory requirement information to obtain atomized security function information that is applied to the trusted execution environment. The processing module 403 performs formal parsing processing on the security function information to obtain a security solution of the trusted execution environment, where the security solution can prove that it satisfies the regulatory requirement information, and generates a test case corresponding to the security solution of the trusted execution environment based on an axiom of the security solution of the trusted execution environment. The trusted-environment construction module 404 constructs, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario.

In the embodiments of this specification, the trusted-environment construction module 404 includes the following: a sub-solution construction unit, configured to construct a security sub-solution of the trusted execution environment in the target scenario by using a homomorphism interpretation based on the security solution of the trusted execution environment; a sub-case construction unit, configured to obtain constraint information of the trusted execution environment in the target scenario; and construct a test sub-case of the trusted execution environment in the target scenario by using a homomorphism interpretation with reference to the constraint information based on the test case corresponding to the security solution of the trusted execution environment; and a trusted-environment construction unit, configured to generate the trusted execution environment in the target scenario by using modified condition and decision coverage (MC/DC coverage) based on the test sub-case of the trusted execution environment in the target scenario.

In the embodiments of this specification, the target scenario includes one or more of an Internet of Things scenario, a cloud scenario, and a terminal device scenario.

In the embodiments of this specification, the target scenario includes multiple different scenarios, and a property of the security sub-solution of the trusted execution environment is migrated between security sub-solutions of the trusted execution environment in different scenarios by a natural transformation.

In the embodiments of this specification, the target scenario includes multiple different scenarios, and a property of the test sub-case of the trusted execution environment is migrated between test sub-cases of the trusted execution environment in different scenarios by a natural transformation.

In the embodiments of this specification, the regulatory requirement parsing module 402 includes the following: a security function information acquisition unit, configured to obtain security function information constituting the security solution; and a regulatory requirement parsing unit, configured to perform disassembly processing on the regulatory requirement information by using information security common criteria (CC) based on the obtained security function information constituting the security solution, so as to obtain the atomized security function information that is applied to the trusted execution environment.

In the embodiments of this specification, a mutually exclusive collectively exhaustive (MECE) rule is satisfied between different security functions in security functions corresponding to the atomized security function information.

In the embodiments of this specification, the processing module 403 includes the following: a formal processing unit, configured to perform formal parsing processing on the security function information to obtain a preselected security solution of the trusted execution environment; a verification unit, configured to perform, based on the preselected security solution of the trusted execution environment and the regulatory requirement information of the trusted execution environment, processing of verification on whether the preselected security solution of the trusted execution environment satisfies the regulatory requirement information of the trusted execution environment, so as to obtain a corresponding verification result; and a security solution determining unit, configured to, if the verification result indicates that the preselected security solution satisfies the regulatory requirement information of the trusted execution environment, use the preselected security solution as the security solution of the trusted execution environment.

In the embodiments of this specification, the trusted execution environment includes one or more of a trusted execution environment constructed by using SGX and a predetermined first application program, a trusted execution environment constructed by using TrustZone and a predetermined second application program, and a trusted execution environment constructed by using a predetermined third application program.

According to the trusted execution environment construction apparatus provided in the embodiments of this specification, the obtained regulatory requirement information of the trusted execution environment is parsed to obtain the atomized security function information that is applied to the trusted execution environment. Then, formal parsing processing is performed on the security function information to obtain the security solution of the trusted execution environment, where the security solution can prove that it satisfies the regulatory requirement information, and the test case corresponding to the security solution of the trusted execution environment is generated based on the axiom of the security solution of the trusted execution environment. Further, the trusted execution environment that has the same property information as the security solution and the test case with respect to a predetermined property item in the target scenario is constructed by using a predetermined property migration mechanism based on the security solution of the trusted execution environment and the test case corresponding to the security solution of the trusted execution environment. As such, the general security solution and the general test case, etc. of the trusted execution environment are constructed based on a formal and axiomatical form, and a regulatory requirement is described on this basis, so that the regulatory requirement is consistent with the technical solutions such as the general security solution and the general test case and is comprehensive. In addition, by using the technical solutions provided in the embodiments, the regulatory requirement can be comprehensively and consistently transferred or migrated to a specific implementation of the trusted execution environment in the specific target scenario, so as to avoid repeated authentication on the regulatory requirement in different scenarios and improve trusted execution environment construction efficiency.

In addition, a general technical solution of the trusted execution environment is constructed based on formalization in a form of a axiomatical constraint, and a regulatory requirement is described on this basis, so that the regulatory requirement is consistent with the general technical solution and is comprehensive. In addition, a homomorphic relationship between the general technical solution and a technical solution in a specific scenario is constructed, so that the regulatory requirement is consistent with the technical solution in the specific scenario and is comprehensive. Moreover, a natural transformation relationship between technical solutions in different scenarios is constructed, so that the regulatory requirement can be transferred between different scenarios. In addition, based on the axiomatical constraint, a general test case that is consistent with a regulatory requirement and that is comprehensive is formed, and a homomorphic relationship between the general test case and a test sub-case in a specific scenario is constructed, so that the test sub-case in the specific scenario is maintained consistent with the regulatory requirement and comprehensive. Moreover, a natural transformation relationship between test sub-cases in different specific scenarios is constructed, so that the test sub-cases in different scenarios are consistent with the regulatory requirement and are comprehensive.

Embodiment 4

Figure 5:
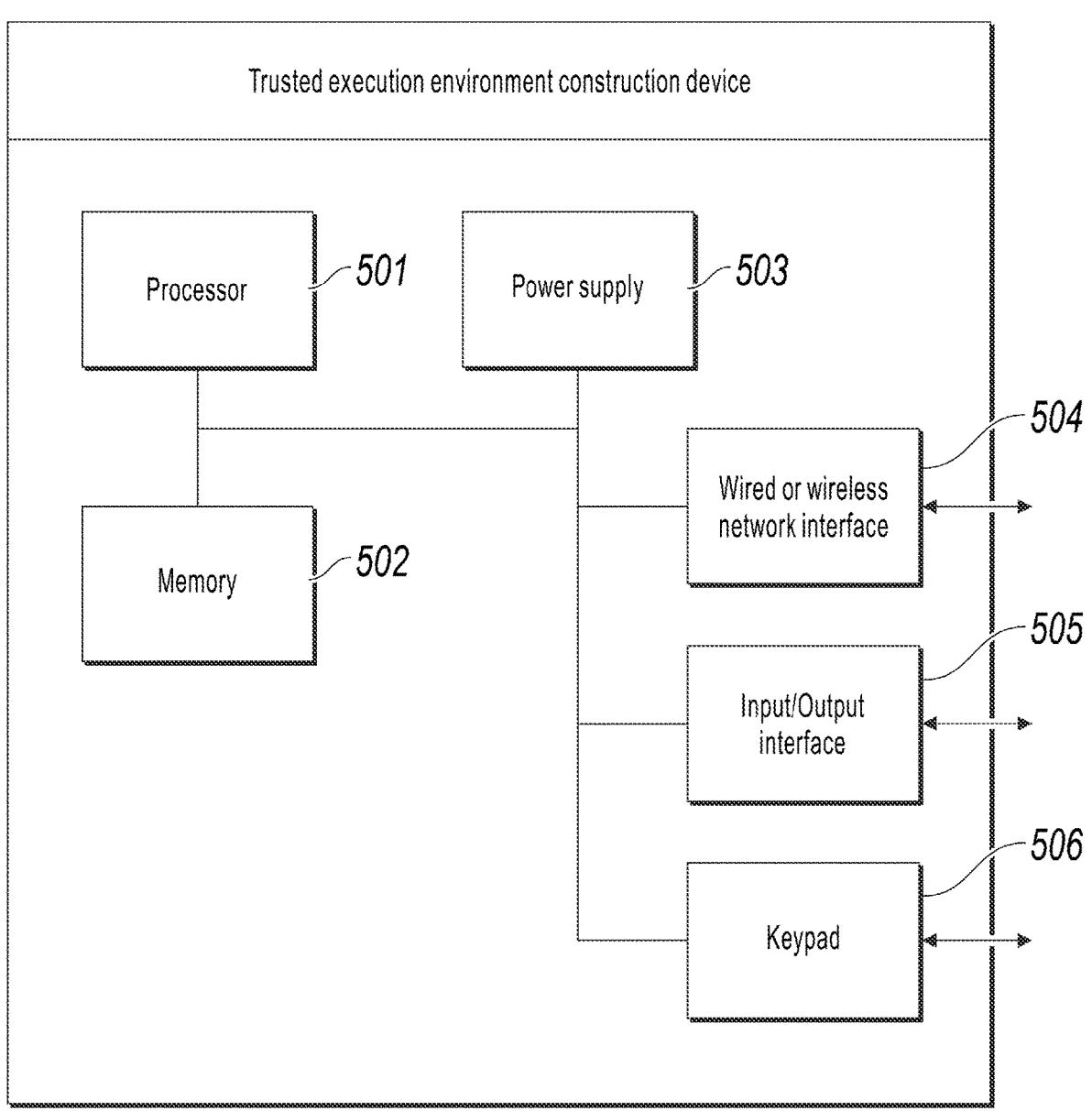
FIG. 5 illustrates some embodiments of a trusted execution environment construction device, according to this specification.

The description above is the trusted execution environment construction apparatus provided in some embodiments of this specification. Based on the same idea, some embodiments of this specification further provide a trusted execution environment construction device, as shown in FIG. 5.

The trusted execution environment construction device can be a server or a terminal device, etc. provided in the above-mentioned embodiments.

The trusted execution environment construction device can differ greatly because of a difference in configuration or performance, and can include one or more processors 501 and one or more storages 502. The storage 502 can store one or more applications or data. The storage 502 can be used for temporary storage or persistent storage. The application stored in the storage 502 can include one or more modules (not shown in the figure), and each module can include a series of computer-executable instructions in the trusted execution environment construction device. Still further, the processor 501 can be configured to communicate with the storage 502 to execute a series of computer-executable instructions in the storage 502 on the trusted execution environment construction device. The trusted execution environment construction device can further include one or more power supplies 503, one or more wired or wireless network interfaces 504, one or more input/output interfaces 505, one or more keypads 506, etc.

Specifically, in the embodiments, the trusted execution environment construction device includes a storage and one or more programs, where the one or more programs are stored in the storage, and the one or more programs can include one or more modules, and each module can include a series of computer-executable instructions in the trusted execution environment construction device. One or more processors are configured to execute the computer-executable instructions included in the one or more programs to perform the following operations: obtaining regulatory requirement information of a trusted execution environment; parsing the regulatory requirement information to obtain atomized security function information that is applied to the trusted execution environment; performing formal parsing processing on the security function information to obtain a security solution of the trusted execution environment, where the security solution can prove that it satisfies the regulatory requirement information, and generating a test case corresponding to the security solution of the trusted execution environment based on an axiom of the security solution of the trusted execution environment; and constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario.

In the embodiments of this specification, the constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario includes the following: constructing a security sub-solution of the trusted execution environment in the target scenario by using a homomorphism interpretation based on the security solution of the trusted execution environment; obtaining constraint information of the trusted execution environment in the target scenario; constructing a test sub-case of the trusted execution environment in the target scenario by using a homomorphism interpretation with reference to the constraint information based on the test case corresponding to the security solution of the trusted execution environment; and generating the trusted execution environment in the target scenario by using modified condition and decision coverage (MC/DC coverage) based on the test sub-case of the trusted execution environment in the target scenario.

In the embodiments of this specification, the target scenario includes one or more of an Internet of Things scenario, a cloud scenario, and a terminal device scenario.

In the embodiments of this specification, the target scenario includes multiple different scenarios, and a property of the security sub-solution of the trusted execution environment is migrated between security sub-solutions of the trusted execution environment in different scenarios by a natural transformation.

In the embodiments of this specification, the target scenario includes multiple different scenarios, and a property of the test sub-case of the trusted execution environment is migrated between test sub-cases of the trusted execution environment in different scenarios by a natural transformation.

In the embodiments of this specification, the parsing the regulatory requirement information to obtain atomized security function information that is applied to the trusted execution environment includes the following: obtaining security function information constituting the security solution; and performing disassembly processing on the regulatory requirement information by using information security common criteria (CC) based on the obtained security function information constituting the security solution, so as to obtain the atomized security function information that is applied to the trusted execution environment.

In the embodiments of this specification, a mutually exclusive collectively exhaustive (MECE) rule is satisfied between different security functions in security functions corresponding to the atomized security function information.

In the embodiments of this specification, the performing formal parsing processing on the security function information to obtain a security solution of the trusted execution environment, where the security solution can prove that it satisfies the regulatory requirement information includes the following: performing formal parsing processing on the security function information to obtain a preselected security solution of the trusted execution environment; performing, based on the preselected security solution of the trusted execution environment and the regulatory requirement information of the trusted execution environment, processing of verification on whether the preselected security solution of the trusted execution environment satisfies the regulatory requirement information of the trusted execution environment, so as to obtain a corresponding verification result; and if the verification result indicates that the preselected security solution satisfies the regulatory requirement information of the trusted execution environment, using the preselected security solution as the security solution of the trusted execution environment.

In the embodiments of this specification, the trusted execution environment includes one or more of a trusted execution environment constructed by using SGX and a predetermined first application program, a trusted execution environment constructed by using TrustZone and a predetermined second application program, and a trusted execution environment constructed by using a predetermined third application program.

According to the trusted execution environment construction device provided in the embodiments of this specification, the obtained regulatory requirement information of the trusted execution environment is parsed to obtain the atomized security function information that is applied to the trusted execution environment. Then, formal parsing processing is performed on the security function information to obtain the security solution of the trusted execution environment, where the security solution can prove that it satisfies the regulatory requirement information, and the test case corresponding to the security solution of the trusted execution environment is generated based on the axiom of the security solution of the trusted execution environment. Further, the trusted execution environment that has the same property information as the security solution and the test case with respect to the predetermined property item in the target scenario is constructed by using the predetermined property migration mechanism based on the security solution of the trusted execution environment and the test case corresponding to the security solution of the trusted execution environment. As such, the general security solution and the general test case, etc. of the trusted execution environment are constructed based on a formal and axiomatical form, and a regulatory requirement is described on this basis, so that the regulatory requirement is consistent with the technical solutions such as the general security solution and the general test case and is comprehensive. In addition, by using the technical solutions provided in the embodiments, the regulatory requirement can be comprehensively and consistently transferred or migrated to a specific implementation of the trusted execution environment in the specific target scenario, so as to avoid repeated authentication on the regulatory requirement in different scenarios and improve trusted execution environment construction efficiency.

In addition, a general technical solution of the trusted execution environment is constructed based on formalization in a form of a axiomatical constraint, and a regulatory requirement is described on this basis, so that the regulatory requirement is consistent with the general technical solution and is comprehensive. In addition, a homomorphic relationship between the general technical solution and a technical solution in a specific scenario is constructed, so that the regulatory requirement is consistent with the technical solution in the specific scenario and is comprehensive. Moreover, a natural transformation relationship between technical solutions in different scenarios is constructed, so that the regulatory requirement can be transferred between different scenarios. In addition, based on the axiomatical constraint, a general test case that is consistent with a regulatory requirement and that is comprehensive is formed, and a homomorphic relationship between the general test case and a test sub-case in a specific scenario is constructed, so that the test sub-case in the specific scenario is maintained consistent with the regulatory requirement and comprehensive. Moreover, a natural transformation relationship between test sub-cases in different specific scenarios is constructed, so that the test sub-cases in different scenarios are consistent with the regulatory requirement and are comprehensive.

Embodiment 5

Further, based on the methods shown in FIG. 1 to FIG. 3, one or more embodiments of this specification further provide a storage medium, configured to store a computer-executable instruction. In a specific embodiment, the storage medium can be a USB flash drive, an optical disc, a hard disk, etc. When the computer-executable instruction stored in the storage medium is executed by a processor, the following procedure can be implemented: obtaining regulatory requirement information of a trusted execution environment; parsing the regulatory requirement information to obtain atomized security function information that is applied to the trusted execution environment; performing formal parsing processing on the security function information to obtain a security solution of the trusted execution environment, where the security solution can prove that it satisfies the regulatory requirement information, and generating a test case corresponding to the security solution of the trusted execution environment based on an axiom of the security solution of the trusted execution environment; and constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario.

In the embodiments of this specification, the constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario includes the following: constructing a security sub-solution of the trusted execution environment in the target scenario by using a homomorphism interpretation based on the security solution of the trusted execution environment; obtaining constraint information of the trusted execution environment in the target scenario; constructing a test sub-case of the trusted execution environment in the target scenario by using a homomorphism interpretation with reference to the constraint information based on the test case corresponding to the security solution of the trusted execution environment; and generating the trusted execution environment in the target scenario by using modified condition and decision coverage (MC/DC coverage) based on the test sub-case of the trusted execution environment in the target scenario.

In the embodiments of this specification, the target scenario includes one or more of an Internet of Things scenario, a cloud scenario, and a terminal device scenario.

In the embodiments of this specification, the target scenario includes multiple different scenarios, and a property of the security sub-solution of the trusted execution environment is migrated between security sub-solutions of the trusted execution environment in different scenarios by a natural transformation.

In the embodiments of this specification, the target scenario includes multiple different scenarios, and a property of the test sub-case of the trusted execution environment is migrated between test sub-cases of the trusted execution environment in different scenarios by a natural transformation.

In the embodiments of this specification, the parsing the regulatory requirement information to obtain atomized security function information that is applied to the trusted execution environment includes the following: obtaining security function information constituting the security solution; and performing disassembly processing on the regulatory requirement information by using information security common criteria (CC) based on the obtained security function information constituting the security solution, so as to obtain the atomized security function information that is applied to the trusted execution environment.

In the embodiments of this specification, a mutually exclusive collectively exhaustive (MECE) rule is satisfied between different security functions in security functions corresponding to the atomized security function information.

In the embodiments of this specification, the performing formal parsing processing on the security function information to obtain a security solution of the trusted execution environment, where the security solution can prove that it satisfies the regulatory requirement information includes the following: performing formal parsing processing on the security function information to obtain a preselected security solution of the trusted execution environment; performing, based on the preselected security solution of the trusted execution environment and the regulatory requirement information of the trusted execution environment, processing of verification on whether the preselected security solution of the trusted execution environment satisfies the regulatory requirement information of the trusted execution environment, so as to obtain a corresponding verification result; and if the verification result indicates that the preselected security solution satisfies the regulatory requirement information of the trusted execution environment, using the preselected security solution as the security solution of the trusted execution environment.

In the embodiments of this specification, the trusted execution environment includes one or more of a trusted execution environment constructed by using SGX and a predetermined first application program, a trusted execution environment constructed by using TrustZone and a predetermined second application program, and a trusted execution environment constructed by using a predetermined third application program.

According to the storage medium provided in the embodiments of this specification, the obtained regulatory requirement information of the trusted execution environment is parsed to obtain the atomized security function information that is applied to the trusted execution environment. Then, formal parsing processing is performed on the security function information to obtain the security solution of the trusted execution environment, where the security solution can prove that it satisfies the regulatory requirement information, and the test case corresponding to the security solution of the trusted execution environment is generated based on the axiom of the security solution of the trusted execution environment. Further, the trusted execution environment that has the same property information as the security solution and the test case with respect to the predetermined property item in the target scenario is constructed by using the predetermined property migration mechanism based on the security solution of the trusted execution environment and the test case corresponding to the security solution of the trusted execution environment. As such, the general security solution and the general test case, etc. of the trusted execution environment are constructed based on a formal and axiomatical form, and the regulatory requirement is described on this basis, so that a regulatory requirement is consistent with the technical solutions such as the general security solution and the general test case and is comprehensive. In addition, by using the technical solutions provided in the embodiments, the regulatory requirement can be comprehensively and consistently transferred or migrated to a specific implementation of the trusted execution environment in the specific target scenario, so as to avoid repeated authentication on the regulatory requirement in different scenarios and improve trusted execution environment construction efficiency.

In addition, a general technical solution of the trusted execution environment is constructed based on formalization in a form of a axiomatical constraint, and a regulatory requirement is described on this basis, so that the regulatory requirement is consistent with the general technical solution and is comprehensive. In addition, a homomorphic relationship between the general technical solution and a technical solution in a specific scenario is constructed, so that the regulatory requirement is consistent with the technical solution in the specific scenario and is comprehensive. Moreover, a natural transformation relationship between technical solutions in different scenarios is constructed, so that the regulatory requirement can be transferred between different scenarios. In addition, based on the axiomatical constraint, a general test case that is consistent with a regulatory requirement and that is comprehensive is formed, and a homomorphic relationship between the general test case and a test sub-case in a specific scenario is constructed, so that the test sub-case in the specific scenario is maintained consistent with the regulatory requirement and comprehensive. Moreover, a natural transformation relationship between test sub-cases in different specific scenarios is constructed, so that the test sub-cases in different scenarios are consistent with the regulatory requirement and are comprehensive.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular order or consecutive order to achieve the desired results. In some implementations, multi-tasking and parallel processing are feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors:

ARC 625D, Atmel AT91SAM, Microchip PIC18F26K20, and Silicone Labs C8051F320. The storage controller can also be implemented as a part of the control logic of the storage. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The systems, apparatuses, modules, or units illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, during implementation of one or more embodiments of this specification, the functions of units can be implemented in one or more pieces of software and/or hardware.

A person skilled in the art should understand that the embodiments of this specification can be provided as methods, systems, or computer program products. Therefore, the one or more implementations of this specification can use a form of hardware only implementations, software only implementations, or implementations with a combination of software and hardware. In addition, one or more embodiments of this specification can use a form of a computer program product that is implemented on one or more computer-usable storage media (including but not limited to a disk storage, a CD-ROM, an optical storage, etc.) that include computer-usable program code.

Some embodiments of this specification are described with reference to the flowcharts and/or block diagrams of the method, the device (system), and the computer program product according to some embodiments of this specification. It should be noted that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable fraudulent case serial/parallel device to generate a machine so that the instructions executed by the computer or the processor of the another programmable fraudulent case serial/parallel device generate an apparatus for implementing a specific function in one or more processes in the flowcharts and/or in one or more blocks in the block diagrams.

These computer program instructions can be stored in a computer-readable storage that can instruct the computer or the another programmable fraudulent case serial/parallel device to work in a specific way so that the instructions stored in the computer-readable storage generate an artifact that includes an instruction apparatus. The instruction apparatus implements a specific function in one or more processes in the flowcharts and/or in one or more blocks in the block diagrams.

These computer program instructions can alternatively be loaded onto the computer or the another programmable fraudulent case serial/parallel device so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), an input/output interface, a network interface, and a memory.

The memory can include a non-persistent storage, a random access memory (RAM), and/or a non-volatile memory in a computer-readable medium, for example, a read-only memory (ROM) or a flash read-only memory (flash RAM). The memory is an example of the computer-readable medium.

The computer-readable medium includes persistent, non-persistent, movable, and unmovable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in this specification, the computer-readable medium does not include computer-readable transitory media (transitory media) such as a modulated data signal and a carrier.

It should be further noted that, the terms "include", "comprise", or their any other variants are intended to cover a non-exclusive inclusion, so a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that the embodiments of this specification can be provided as a method, a system, or a computer program product. Therefore, one or more embodiments of this specification may take the form of a hardware-only embodiment, a software-only embodiment, or an embodiment with a combination of software and hardware. In addition, one or more embodiments of this specification can use a form of a computer program product that is implemented on one or more computer-usable storage media (including but not limited to a disk storage, a CD-ROM, an optical storage, etc.) that include computer-usable program code.

The one or more implementations of the present specification can be described in common contexts of computer-executable instructions executed by a computer, such as a program module. Generally, the program module includes a routine, a program, an object, a component, a data structure, etc. executing a specific task or implementing a specific abstract data type. One or more embodiments of this specification can alternatively be practiced in distributed computing environments in which tasks are performed by remote processing devices that are connected through a communications network. In a distributed computing environment, the program module can be located in both local and remote computer storage media including storage devices.

The embodiments in this specification are described in a progressive way. For same or similar parts of the embodiments, reference can be made to the embodiments mutually. Each embodiment focuses on a difference from other embodiments. Particularly, a system embodiment is similar to a method embodiment, and therefore is described briefly. For related parts, reference can be made to partial descriptions in the method embodiment.

The above-mentioned descriptions are merely some embodiments of this specification, and are not intended to limit this specification. A person skilled in the art can make various variations and changes to this specification. Any modification, equivalent replacement, and improvement made in the spirit and principle of this specification shall fall within the scope of the claims in this specification.

What is claimed is:

1. A computer-implemented method for trusted execution environment construction, comprising:

obtaining regulatory requirement information of a trusted execution environment;

parsing the regulatory requirement information to obtain atomized security function information that is applied to the trusted execution environment;

performing formal parsing processing on the atomized security function information to obtain a security solution of the trusted execution environment, wherein the security solution can prove that it satisfies the regulatory requirement information, and generating a test case corresponding to the security solution of the trusted execution environment based on an axiom of the security solution of the trusted execution environment; and constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario, wherein the predetermined property migration mechanism comprises at least one of (i) a homomorphism interpretation for constructing a security sub-solution of the trusted execution environment in the target scenario based on the security solution of the trusted execution environment, or (ii) a natural transformation for migrating a property of the security sub-solution of the trusted execution environment between security sub-solutions of the trusted execution environment in multiple different scenarios.

2. The computer-implemented method of claim 1, wherein constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario, comprises:

constructing the security sub-solution of the trusted execution environment in the target scenario by using the homomorphism interpretation based on the security solution of the trusted execution environment;

obtaining constraint information of the trusted execution environment in the target scenario; and constructing a test sub-case of the trusted execution environment in the target scenario by using a homomorphism interpretation with reference to the constraint information based on the test case corresponding to the security solution of the trusted execution environment; and generating the trusted execution environment in the target scenario by using modified condition and decision coverage (MC/DC coverage) based on the test sub-case of the trusted execution environment in the target scenario.

3. The computer-implemented method of claim 2, wherein the target scenario comprises one or more of an Internet of Things scenario, a cloud scenario, and a terminal device scenario.

4. The computer-implemented method of claim 3, wherein the target scenario comprises the multiple different scenarios, and the property of the security sub-solution of the trusted execution environment is migrated between the security sub-solutions of the trusted execution environment in the multiple different scenarios by the natural transformation.

5. The computer-implemented method of claim 3, wherein the target scenario comprises the multiple different scenarios, and a property of the test sub-case of the trusted execution environment is migrated between test sub-cases of the trusted execution environment in the multiple different scenarios by the natural transformation.

6. The computer-implemented method of claim 1, wherein parsing the regulatory requirement information to obtain atomized security function information that is applied to the trusted execution environment, comprises:

obtaining, as obtained security function information, security function information constituting the security solution; and performing disassembly processing on the regulatory requirement information by using information security common criteria (CC) based on the obtained security function information constituting the security solution, so as to obtain the atomized security function information that is applied to the trusted execution environment.

7. The computer-implemented method of claim 6, wherein a mutually exclusive collectively exhaustive (MECE) rule is satisfied between different security functions in security functions corresponding to the atomized security function information.

8. The computer-implemented method of claim 1, wherein performing formal parsing processing on the atomized security function information to obtain a security solution of the trusted execution environment, wherein the security solution can prove that it satisfies the regulatory requirement information, comprises:

performing formal parsing processing on the atomized security function information to obtain a preselected security solution of the trusted execution environment;

performing, based on the preselected security solution of the trusted execution environment and the regulatory requirement information of the trusted execution environment, processing of verification on whether the preselected security solution of the trusted execution environment satisfies the regulatory requirement information of the trusted execution environment, so as to obtain a corresponding verification result; and if the corresponding verification result indicates that the preselected security solution satisfies the regulatory requirement information of the trusted execution environment, using the preselected security solution as the security solution of the trusted execution environment.

9. The computer-implemented method of claim 1, wherein the trusted execution environment comprises one or more of a trusted execution environment constructed by using SGX and a predetermined first application program, a trusted execution environment constructed by using Trust-Zone and a predetermined second application program, and a trusted execution environment constructed by using a predetermined third application program.

10. A non-transitory, computer-readable medium storing one or more instructions executable by a computer system to perform one or more operations for trusted execution environment construction, comprising:

obtaining regulatory requirement information of a trusted execution environment;

parsing the regulatory requirement information to obtain atomized security function information that is applied to the trusted execution environment;

performing formal parsing processing on the atomized security function information to obtain a security solution of the trusted execution environment, wherein the security solution can prove that it satisfies the regulatory requirement information, and generating a test case corresponding to the security solution of the trusted execution environment based on an axiom of the security solution of the trusted execution environment; and constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario, wherein the predetermined property migration mechanism comprises at least one of (i) a homomorphism interpretation for constructing a security sub-solution of the trusted execution environment in the target scenario based on the security solution of the trusted execution environment, or (ii) a natural transformation for migrating a property of the security sub-solution of the trusted execution environment between security sub-solutions of the trusted execution environment in multiple different scenarios.

11. The non-transitory, computer-readable medium of claim 10, wherein constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario, comprises:

constructing the security sub-solution of the trusted execution environment in the target scenario by using the homomorphism interpretation based on the security solution of the trusted execution environment;

obtaining constraint information of the trusted execution environment in the target scenario; and constructing a test sub-case of the trusted execution environment in the target scenario by using a homomorphism interpretation with reference to the constraint information based on the test case corresponding to the security solution of the trusted execution environment; and generating the trusted execution environment in the target scenario by using modified condition and decision coverage (MC/DC coverage) based on the test sub-case of the trusted execution environment in the target scenario.

12. The non-transitory, computer-readable medium of claim 11, wherein the target scenario comprises one or more of an Internet of Things scenario, a cloud scenario, and a terminal device scenario.

13. The non-transitory, computer-readable medium of claim 12, wherein the target scenario comprises the multiple different scenarios, and the property of the security sub-solution of the trusted execution environment is migrated between the security sub-solutions of the trusted execution environment in the multiple different scenarios by the natural transformation.

14. The non-transitory, computer-readable medium of claim 12, wherein the target scenario comprises the multiple different scenarios, and a property of the test sub-case of the trusted execution environment is migrated between test sub-cases of the trusted execution environment in the multiple different scenarios by the natural transformation.

15. The non-transitory, computer-readable medium of claim 10, wherein parsing the regulatory requirement information to obtain atomized security function information that is applied to the trusted execution environment, comprises:

obtaining, as obtained security function information, security function information constituting the security solution; and performing disassembly processing on the regulatory requirement information by using information security common criteria (CC) based on the obtained security function information constituting the security solution, so as to obtain the atomized security function information that is applied to the trusted execution environment.

16. The non-transitory, computer-readable medium of claim 15, wherein a mutually exclusive collectively exhaustive (MECE) rule is satisfied between different security functions in security functions corresponding to the atomized security function information.

17. The non-transitory, computer-readable medium of claim 10, wherein performing formal parsing processing on the atomized security function information to obtain a security solution of the trusted execution environment, wherein the security solution can prove that it satisfies the regulatory requirement information, comprises:

performing formal parsing processing on the atomized security function information to obtain a preselected security solution of the trusted execution environment;

performing, based on the preselected security solution of the trusted execution environment and the regulatory requirement information of the trusted execution environment, processing of verification on whether the preselected security solution of the trusted execution environment satisfies the regulatory requirement information of the trusted execution environment, so as to obtain a corresponding verification result; and if the corresponding verification result indicates that the preselected security solution satisfies the regulatory requirement information of the trusted execution environment, using the preselected security solution as the security solution of the trusted execution environment.

18. The non-transitory, computer-readable medium of claim 10, wherein the trusted execution environment comprises one or more of a trusted execution environment constructed by using SGX and a predetermined first application program, a trusted execution environment constructed by using TrustZone and a predetermined second application program, and a trusted execution environment constructed by using a predetermined third application program.

19. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for trusted execution environment construction, comprising:

obtaining regulatory requirement information of a trusted execution environment;

parsing the regulatory requirement information to obtain atomized security function information that is applied to the trusted execution environment;

performing formal parsing processing on the atomized security function information to obtain a security solution of the trusted execution environment, wherein the security solution can prove that it satisfies the regulatory requirement information, and generating a test case corresponding to the security solution of the trusted execution environment based on an axiom of the security solution of the trusted execution environment; and constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario, wherein the predetermined property migration mechanism comprises at least one of (i) a homomorphism interpretation for constructing a security sub-solution of the trusted execution environment in the target scenario based on the security solution of the trusted execution environment, or (ii) a natural transformation for migrating a property of the security sub-solution of the trusted execution environment between security sub-solutions of the trusted execution environment in multiple different scenarios.

20. The computer-implemented system of claim 19, wherein constructing, by using a predetermined property migration mechanism based on the security solution of the trusted execution environment and the test case corresponding to the security solution of the trusted execution environment, a trusted execution environment that has same property information as the security solution and the test case with respect to a predetermined property item in a target scenario, comprises:

constructing the security sub-solution of the trusted execution environment in the target scenario by using the homomorphism interpretation based on the security solution of the trusted execution environment;

obtaining constraint information of the trusted execution environment in the target scenario; and constructing a test sub-case of the trusted execution environment in the target scenario by using a homomorphism interpretation with reference to the constraint information based on the test case corresponding to the security solution of the trusted execution environment; and generating the trusted execution environment in the target scenario by using modified condition and decision coverage (MC/DC coverage) based on the test sub-case of the trusted execution environment in the target scenario.

* * * * *